Dec. 25, 1934. M. GOLDENBERG 1,985,775
SHOE CLEAT ATTACHMENT
Filed Sept. 6, 1932
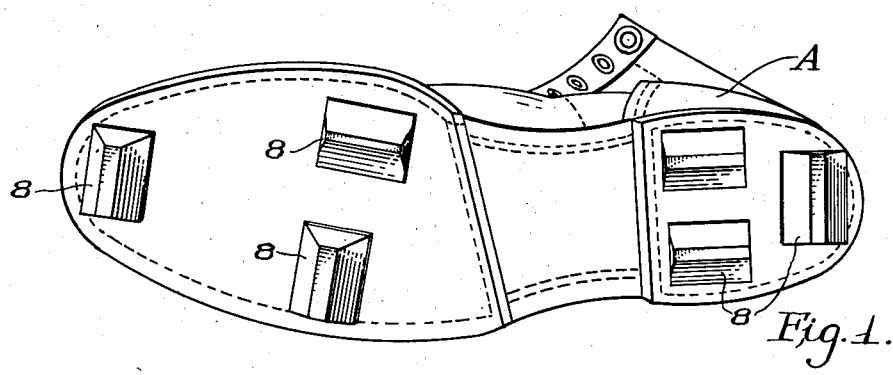
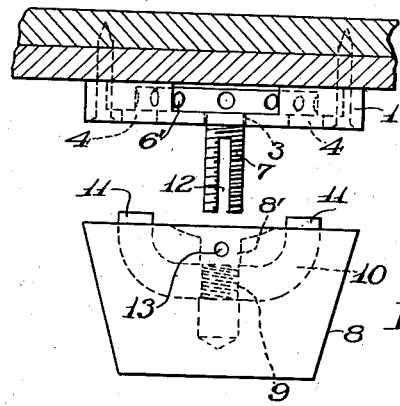
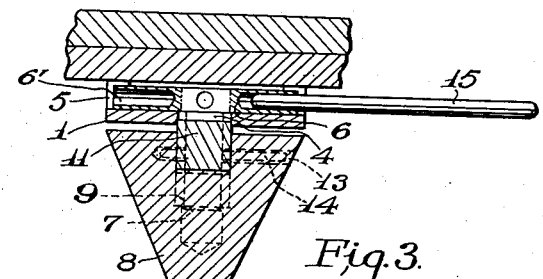
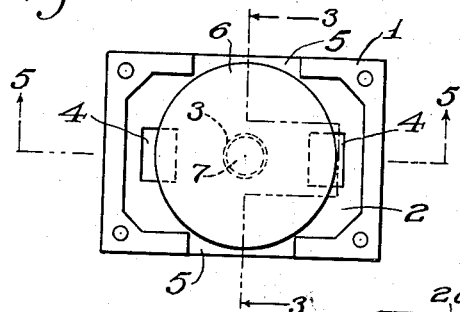
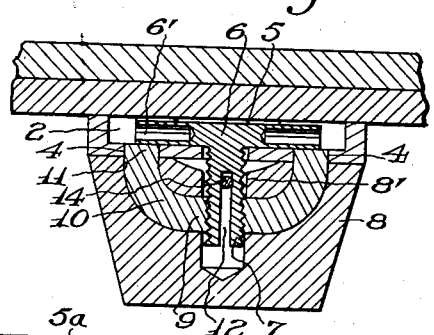
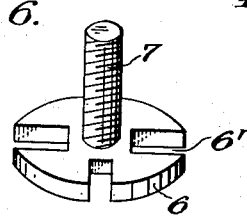
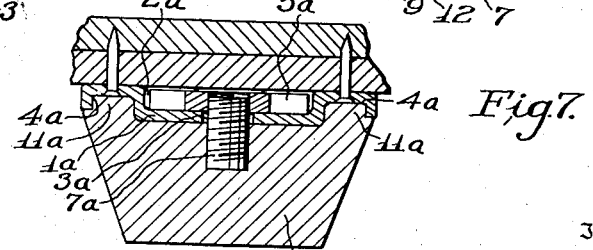
Inventor
MICHAEL GOLDENBERG.
By
Attorney Patented Dec. 25, 1934

1,985,775

UNITED STATES PATENT OFFICE 1,985,775

SHOE CLEAT ATTACHMENT

Michael Goldenberg, Philadelphia, Pa.

Application September 6, 1932, Serial No. 631,866

7 Claims. (Cl. 36—59)

My invention is designed to provide improved means for detachably securing cleats to athletic shoes while preventing the rotation or disengagement of such cleats and avoiding the exposure of metallic members likely to cause injury to other players. My improvements are particularly applicable to the attachment of cleats having a greater length than width.

In accordance with my improvements, the cleat is moved rectilineally toward or from the shoe sole by a stem and a rotatable member housed between the cleat and shoe sole to anchor the cleat to the sole and effect the engagement or disengagement of interlocking members preventing turning of the cleat. Preferably a metallic plate or sheet secured to the sole by nails or rivets, forms a housing for the rotatable member and a bearing against which the cleat may be tightly drawn by the rotation of the rotatable member acting through a stem projecting through the plate. The interlocking members preferably consist of a key or cotter fixed to one of the members and adapted for engagement with a keeper or socket of the other member and as many locking devices may be used as are deemed necessary to resist the torque or thrust to which the cleat is subjected. Preferably the locking devices comprise a key or lugs and keeper at each side of, and spaced from, the axis of the rotatable member, and a key or cotter passing through the cleat and through the shank by which the rotatable member draws up the cleat against the face of the holder.

The characteristic features and advantages of my improvements will further appear from the following description and the accompanying drawing in illustration of a preferred embodiment of my invention.

In the drawing, Fig. 1 is a perspective view of an athletic shoe having cleats attached thereto in accordance with my improvements; Fig. 2 is a fragmentary view showing in side elevation the cleat holder and cleat spaced from one another; Fig. 3 is an irregular sectional view on the line 3—3 of Fig. 4; Fig. 4 is a plan view of the detached holder; Fig. 5 is a longitudinal sectional view through the cleat and holder taken on the line 5—5 of Fig. 4; Fig. 6 is a detached perspective view of a form of rotatable member for drawing up the cleat against the holder; and Fig. 7 is a longitudinal sectional view of a modified form of cleat and cleat holder.

In the embodiment of my improvements illustrated in Figs. 1 to 6 of the drawing, an athletic shoe A has nailed to the sole thereof cleat holders each comprising a plate 1 containing the recess 2 and having therein bottom apertures 3 and 4 and lateral openings 5.

A rotatable head 6, containing the peripheral slots or recesses 6', is housed within the chamber, between the sole and holder, formed by the recess 2 and has a threaded shank 7 projecting through the aperture 3.

A tapered cleat 8, preferably of an oblong rectangular contour, has embedded in the body thereof a threaded nut 9 registering with the passage 8'. From the nut 9 extend arms or wings 10 having ends projecting from the base of the cleat to form lugs or keys 11 adapted for engagement in the keyways or keepers formed by the slots 4. The shank 7 may have a radial hole or slot 12 therethrough and adapted for registration with a complementary hole 13 formed in the cleat 8 for the reception of a cotter or key 14.

It will be understood that when a cleat is to be attached, its nut 9 is screwed down on the threaded stem 7 until the lugs 11 are adjacent to the outer face of the plate 1. The lugs 11 are then positioned in alignment with the apertures 4 and the head 6 is rotated by the engagement of a suitable pin or wrench 15 in the slots or apertures 6'. The rotation of the head 6 and shank 7 draws the cleat axially down against the face of the plate 1 and the lugs 11 are telescoped within the apertures 4 and prevent any turning movement of the cleat 8 relative to the plate. When the cleat has been drawn up tight, with the slot 13 therein in registration with the slot 12 in the shank, the key or cotter 14 is forced into the slots 12 and 13 and coacts with the lugs 11 to prevent any rotation of the cleat relative to the shank.

In the form of the invention illustrated in Fig. 7, the plate 1a has the keyways 4a formed at each side of the plate, and the cleat 8a has the keys 11a formed at the sides thereof and adapted to be seated in the keyways 4a. The cleat 8a has the shank 7a fixed thereto and passes through the aperture 3a into the chamber formed between the plate 1a and the sole of the shoe. A threaded nut 5a is housed within the chamber 2a and is adapted to be screwed upon the threaded shank 7a so as to draw the cleat 8a down against the surface of the plate 1a and to seat the lugs 11a in the channels 4a to prevent the rotation of the cleat 8a relative to the plate 1a.

Having described my invention, I claim:

1. The combination with a shoe and a cleat, of means for attaching the cleat to the shoe comprising a rotary member for rotatable mounting on the shoe and for moving said cleat toward said shoe, and locking mechanism responsive to said movement for preventing the rotation of said cleat.

2. The combination with a shoe and a cleat, of means for attaching said cleat to said shoe and comprising a plate attached to said shoe and a member projecting from said plate and seated in said cleat, said plate and said cleat having grooves and shoulders respectively cooperating to prevent rotation of the cleat relative to the plate, and a key passing through said cleat and projecting member and preventing displacement of said shoulders.

3. The combination with a shoe and a cleat, of a housing fixed to said shoe, a rotary member revoluble in said housing, an aperture in said housing providing a keyway, a threaded shank connecting said cleat and rotary member, and a key connected with said cleat and responsive to relative movement between the cleat and the shoe for movement into said keyway.

4. The combination with a shoe and a cleat, of means for detachably connecting said cleat to said shoe and comprising a rotary member, a shank connecting said cleat and rotary member, and means positioned by movement of the cleat to operative position on the shoe for preventing the rotation of said cleat by the rotation of said rotary member.

5. The combination with a shoe and a cleat, of means for attaching said cleat to said shoe and comprising a threaded member housed in said cleat and having extensions forming lugs projecting from said cleat, a revoluble member housed between said cleat and shoe, a shank connecting said threaded member and revoluble member, and means forming a keeper for said lugs preventing the rotation of said cleat.

6. The combination with a shoe and a cleat, of means for attaching said cleat to said shoe and comprising a plate forming a housing and a channel, a rotatable member housed in said housing, a shank connecting said cleat and rotatable member, and a lug projecting from said cleat and engaged in said channel.

7. A shoe having a housing fixed externally to the sole thereof, a rotatable member in said housing, said housing containing an aperture permitting the insertion of a tool through said housing into engagement with said rotatable member substantially normal to the axis of rotation thereof, a cleat, a threaded shank connecting said cleat and rotatable member, said cleat being movable toward and from the sole of said shoe by the rotation of said rotatable member by a tool inserted through said housing aperture, said shank being enclosed by said cleat.

MICHAEL GOLDENBERG.